(12) United States Patent
Sullivan

(10) Patent No.: US 11,629,958 B2
(45) Date of Patent: *Apr. 18, 2023

(54) INCREMENT MEASURING DEVICE AND PROCESS

(71) Applicant: Michael G. Sullivan, St. Paul, MN (US)

(72) Inventor: Michael G. Sullivan, St. Paul, MN (US)

(*) Notice: Subject to any disclaimer, the term of this patent is extended or adjusted under 35 U.S.C. 154(b) by 176 days.

This patent is subject to a terminal disclaimer.

(21) Appl. No.: 17/121,331

(22) Filed: Dec. 14, 2020

(65) Prior Publication Data

US 2021/0102806 A1   Apr. 8, 2021

Related U.S. Application Data

(63) Continuation of application No. 16/136,509, filed on Sep. 20, 2018, now Pat. No. 10,900,781.

(60) Provisional application No. 62/561,013, filed on Sep. 20, 2017.

(51) Int. Cl.
| | | |
|---|---|---|
| *G01C 15/00* | (2006.01) | |
| *G01B 11/14* | (2006.01) | |
| *G01B 11/03* | (2006.01) | |

(52) U.S. Cl.
CPC ............ *G01C 15/002* (2013.01); *G01B 11/03* (2013.01); *G01B 11/14* (2013.01)

(58) Field of Classification Search
None
See application file for complete search history.

(56) References Cited

U.S. PATENT DOCUMENTS

| | | | |
|---|---|---|---|
| 998,765 A * | 7/1911 | Foley | G01C 1/00 |
| | | | 33/280 |
| 1,048,570 A | 12/1912 | Murphy | |
| 1,289,534 A | 12/1918 | Petterson | |
| 1,399,963 A | 12/1921 | Hogg | |
| 5,493,786 A | 2/1996 | Thomson | |
| 5,713,135 A | 2/1998 | Acopulos | |
| 5,872,657 A | 2/1999 | Rando | |
| 6,453,568 B1 | 9/2002 | Hymer | |
| 6,560,560 B1 | 5/2003 | Tachner | |
| 6,903,810 B2 | 6/2005 | Gogolla et al. | |
| 9,127,935 B2 | 9/2015 | Olexa | |
| 9,746,313 B2 | 8/2017 | Olexa | |
| 10,900,781 B2 * | 1/2021 | Sullivan | G01C 15/002 |
| 2006/0259269 A1 | 11/2006 | Binder | |
| 2008/0276472 A1 | 11/2008 | Riskus | |
| 2009/0211105 A1 | 8/2009 | Glaser | |

(Continued)

*Primary Examiner* — Christopher W Fulton
(74) *Attorney, Agent, or Firm* — Campbell IP Law LLC

(57) ABSTRACT

A process for determining and indicating an incremental point on a target surface comprises independently rotating a first laser to project a first laser point on the target surface; independently rotating a second laser to project a second laser point on the target surface; measuring an angle of rotation for each of the first laser and the second laser; and based on the measured angle of rotation for each of the first laser and the second laser, calculating a target angle of rotation corresponding to an incremental point between the first laser point and the second laser point on the target surface. A third laser is independently rotated until it reaches the target angle of rotation and projects a third laser point at the incremental point on the target surface.

10 Claims, 4 Drawing Sheets

(56) References Cited

U.S. PATENT DOCUMENTS

| | | |
|---|---|---|
| 2009/0296072 A1 | 12/2009 | Kang |
| 2013/0167384 A1 | 7/2013 | Olexa |
| 2016/0166333 A1 | 6/2016 | Wang et al. |
| 2016/0356889 A1 | 12/2016 | LaMantia et al. |
| 2019/0120622 A1 | 4/2019 | Miller et al. |

* cited by examiner

INCREMENT MEASURING DEVICE AND PROCESS

PRIORITY CLAIMS

This application is a continuation of U.S. patent application Ser. No. 16/136,509 filed Sep. 20, 2018 (now registered as US10900781B2, which claims the benefit of U.S. Provisional Application No. 62/561,013 filed Sep. 20, 2017, the entireties of which applications are hereby incorporated by reference into this application.

BACKGROUND

The present disclosure relates in general to measuring and centering tools, and more specifically, to devices and processes for finding an incremental point or midpoint between two endpoints.

There are many instances where a tool is needed to identify the midpoint or other increment between two endpoints for functional and/or aesthetic reasons. Examples include but are not limited to measuring and optimal placement of functional structures in buildings, such as windows, shelving and lighting, or optimally placing interior design elements in an aesthetically pleasing way, such as the hanging of artwork on walls.

Traditionally, a temporary line is drawn across a surface, such as a wall, using either a standard level or a level-guided laser, and a measuring tool such as a tape measure is used to measure and calculate the midpoint between two endpoints. Endpoints could be defined by corners of a room, outer walls, cabinets, hung pictures, windows, or other surface features, for example. However, such measurement methods are cumbersome and involve the use of multiple tools, and in some cases structures on or near the wall, such as sofas, cabinets, or otherwise, can complicate or get in the way of making the measurements. Furthermore, to measure a midpoint at a high location on a wall or other surface, the user may need to climb a ladder or other structure, putting the user at risk.

Accordingly, devices such as described in U.S. Pat. No. 9,127,935 entitled "Laser Centering Tool for Surface Areas," provide means for remotely finding a midpoint using three projected laser beams. With such device, the user stands at a distance from the surface, and the device projects two outer laser beams equidistant from a center laser beam, such that when the outer laser beams are rotated to the desired endpoints, the center laser beam indicates the center of those two endpoints.

However, such devices are geared in a fixed ratio such that the outer two lasers always move at an equal rate away from the center, static laser, and thus the outer beams remain equidistant from the center beam as they are rotated to meet the endpoints. With such devices, the user is forced to move or stand directly in front of the identified midpoint or center beam. This is not practical in many situations, such as where an obstruction is present in the room that prevents the user from standing at that midpoint location. Additionally, such devices can only show a midpoint, but cannot dynamically determine and indicate other incremental points between two endpoints since this would require complicated gearing mechanisms.

Further, many prior devices have not been optimized from an ergonomic and user-convenience standpoint, and include protruding lasers, switches, knobs or other features that are more vulnerable to getting caught up on clothing or breaking, which prevents such devices from being conveniently stored in a user's pocket or toolkit, for example.

Accordingly, there is a need for an improved measuring device and process that overcomes these and other disadvantages of prior devices, and that further provides improved performance characteristics for the user over a more diverse range of applications.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter. Performance of process steps described herein are not limited to the order or sequence in which they are described.

The present disclosure relates to a measuring device and a process suitable for finding a midpoint or other incremental point between two endpoints on a shared surface.

In one aspect a device for measuring an increment on a surface comprises a housing having a left light source, a right light source and center light source each configured to project a light beam onto a target surface. Each light source is independently rotatable, and in communication with a rotation measuring element configured to measure a degree of rotation of each respective light source. A computing unit is configured to receive a measured degree of rotation value from the rotation measuring element for each of the left light source and the right light source, and to calculate a rotation target value for the center light source corresponding to a desired incremental point on the target surface between a projected left light beam from the left light source and a projected right light beam from the right light source, so that the center light source can be rotated according to the rotation target value and project a center light beam at the desired incremental point.

In another aspect, a process for determining and indicating an incremental point on a target surface comprises rotating a first laser to project a first laser point on the target surface and rotating a second laser to project a second laser point on the target surface. An angle of rotation for each of the first and second lasers is measured, and based on those measurements, a target angle of rotation is calculated to correspond to an incremental point between the first laser point and the second laser point on the target surface. The third laser is then rotated until it reaches the target angle of rotation and projects a third laser point at the incremental point on the target surface.

Other aspects and advantages of the claimed subject matter will be apparent from the following description and the appended claims.

DETAILED DESCRIPTION

Disclosed herein is an improved measuring device and process which can reliably indicate the midpoint or other incremental point between any two endpoints on a common target surface, and wherein the user of the device can stand remotely from the measured surface and flexibly at any location while performing the measurement. Further, all the desired end points and incremental points may be flexibly defined by the user. Other advantageous features of the device and process will become apparent with further description hereafter.

Figure 1:
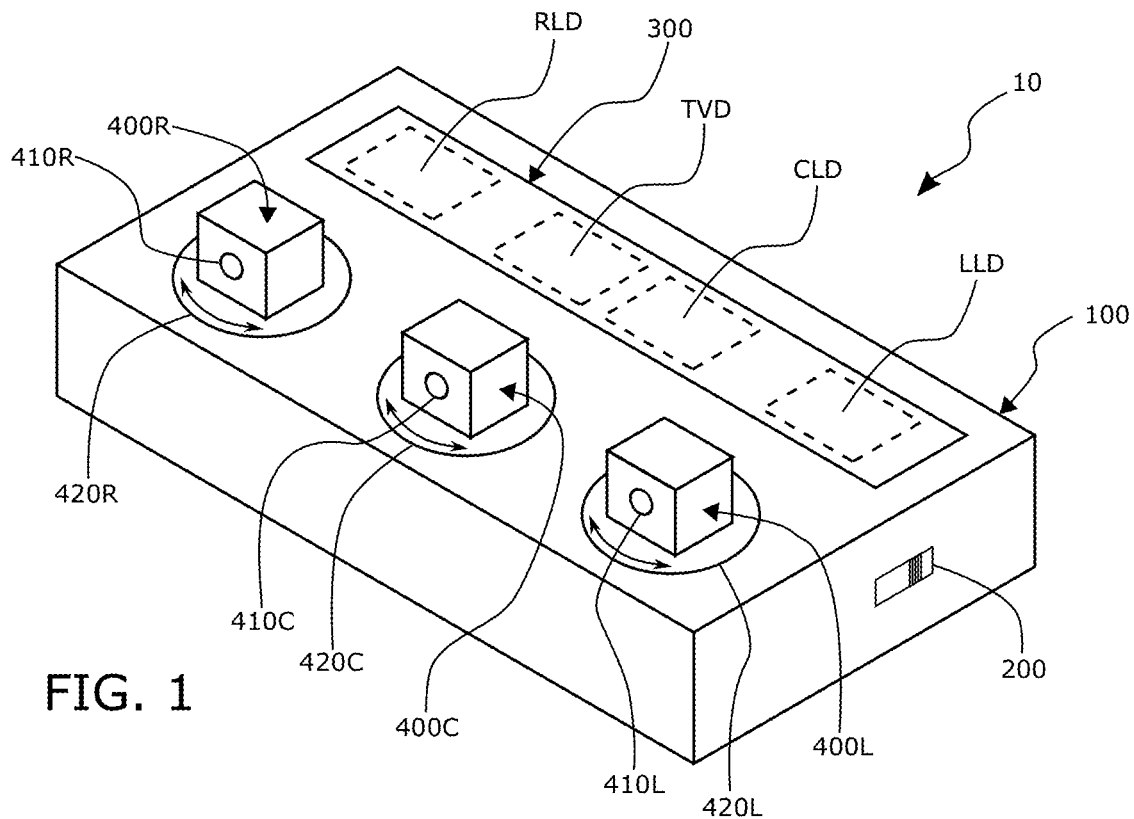
FIG. 1 is an isometric view showing various features of one embodiment of the measuring device.

FIG. 1 is an isometric view of a measuring device 10, including housing 100; power switch 200; display 300 having various zones including a left light display LLD, center light display CLD, target value display TVD, and right light display RLD; three light sources 400 including left light source 400L, center light source 400C, and right light source 400R, each having a light beam projecting portion 410L, 410C, 410R respectively, and each having a rotational element 420L, 420C, 420R respectively. Power switch 200 may comprise a standard slider switch for ON/OFF positions and its surface does not protrude from housing 100.

Each light source 400L, 400C, 400R is coupled to housing 100 via rotational elements 420L, 420C, 420R, respectively, and each is capable of projecting a concentrated light beam from its light beam projecting portion 410L, 410C, 410R respectively. Light beam projecting portions 410L, 410C, 410R can comprise any light-emitting technology capable of projecting a focused, straight beam of light across a distance, such that the end of the light beam is discernable on most surfaces with good visibility and resolution for measuring purposes. For example, light beam projecting portions 410L, 410C, 410R may comprise a laser diode, each projecting the same color or different colors. In one aspect, the light beam from laser diode 410C may be a different color than the light beam from laser diodes 410L and 410R, such that the user can easily identify the light beam emanating from center light source 400C. Alternatively, the color of each light beam could be uniquely color coded to its light source for easier identification.

Each light source 400L, 400C and 400R may be independently rotated as much as 360 degrees relative to housing 100 and relative to one another via their respective rotational elements 420L, 420C 420R in connection with housing 100. Rotation can be accomplished by a user grabbing and twisting each light source 400L, 400C and 400R until each projects a light beam on a common target surface at desired points, for example. Alternatively, a motorized mechanism could also be utilized to drive rotation of one or more of the light sources.

The measured degree of rotation of each light source 400L, 400C, 400R may be represented as a numerical value in display 300 in the relevant display zones LLD, CLD and RLD, respectively. For example, measured degree of rotation for the left light source 400L is represented as a numerical value in left light display LLD, for the center light source 400C is represented in center light display CLD, and for the right light source is represented in right light display RLD. In one example, the measured degree of rotation may be represented and displayed as an angle of rotation having a positive or negative value. A calculated target value for rotating the center light source 400C such that it indicates an incremental point on the target surface, such as a midpoint, is displayed in the target value display TVD, the operation of which is further explained with reference to FIGS. 3-7. Display 300 preferably has a flat surface flush with the surface of housing 100, and may comprise a standard LCD, LED, or other display technology known in the art, preferably having low power consumption, and good visibility in a variety of lighting conditions. Although the location of display 300 is shown on top of housing 100, it may be appreciated that display 300 could be located on other parts of housing 100, including the back surface, for example.

Figure 2:
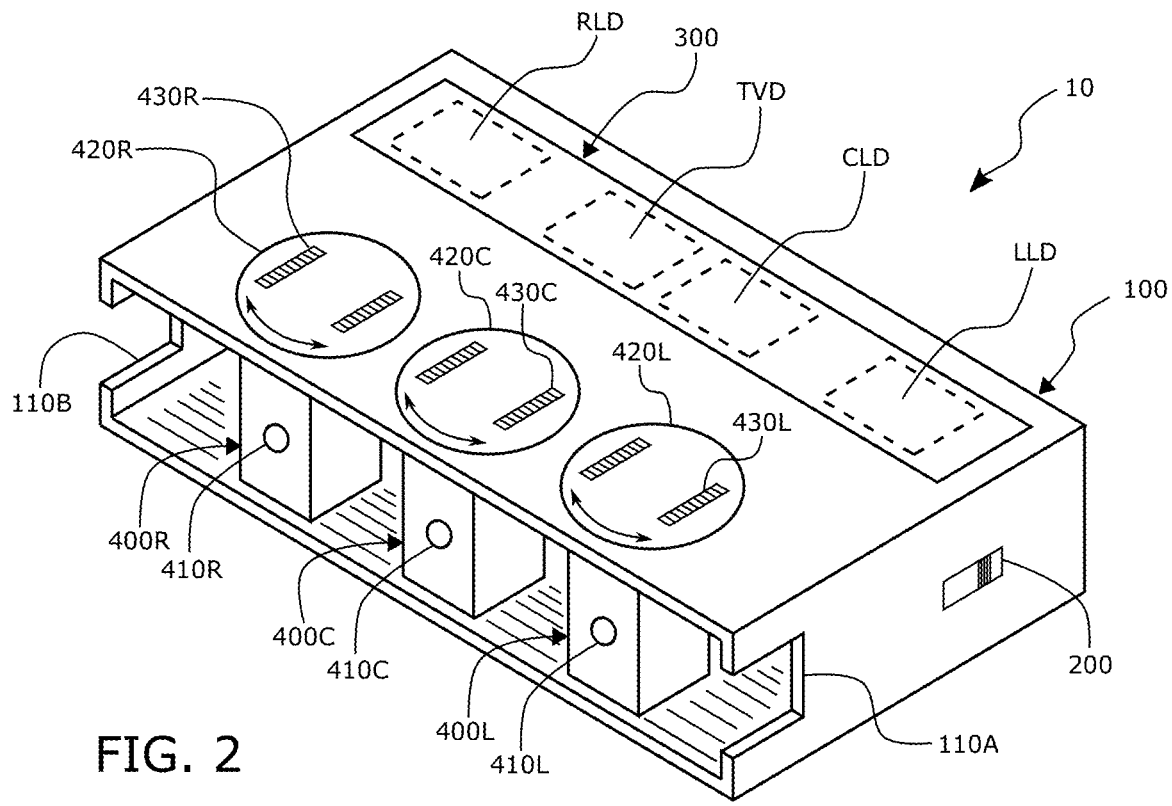
FIG. 2 is an isometric view showing various features of another embodiment of the measuring device.

FIG. 2 is an isometric view showing features of an alternative embodiment of the measuring tool 10, wherein housing 100 includes a left cutout portion 110A and a right cutout portion 110B, and wherein each rotational element 420L, 420C, 420R includes a pair of textured surface strips 430L, 430C, 430R respectively.

In the embodiment of FIG. 2, housing 100 has an open front face, and each light source 400L, 400C, 400R is at least partially enclosed within housing 100 while remaining coupled to housing 100 via their respective rotational elements 420L, 420C, 420R. Preferably, the outermost surfaces of light sources 400L, 400C, 400R are slightly recessed from the front plane of housing 100 in order to provide protection of their components, including light beam projecting portions 410L, 410C, 410R. To prevent obstruction of light beams emanating from light sources 400L and 400R when rotated, left cutout portion 110A and right cutout portion 110B are respectively provided.

To rotate each light source 400L, 400C, 400R, the user can place a pair of fingers on each pair of textured surface strips 430L, 430C, 430R on rotational elements 420L, 420C, 420R, respectively, and drive rotation with a twisting motion of the fingers and hand. The embodiment of FIG. 2 has no elements that protrude from the surfaces of housing 100, and therefore provides superior protection of the light sources 400L, 400C, 400R, and can also be more easily stored in a clothes pocket or tool kit, for example.

Further, it may be appreciated that although the representation of light sources 400L, 400C, 400R in FIGS. 1 and 2 is rectangular, preferably a contoured or cylindrical shape is utilized to minimize physical surface obstruction of light beams projected from adjacent light sources. Furthermore, housing 100 may comprise various additional features, including a tripod mount on its base to enable stable mounting of measuring device 10 for more accurate measurements. Housing 100 may also be coated with a rubberized paint or textured surface to prevent slippage or dropping when in use, and may also incorporate one or more level guide indicators, such as digital or bubble levels, to assist the positioning of measuring device 10 during its use.

Figure 3:
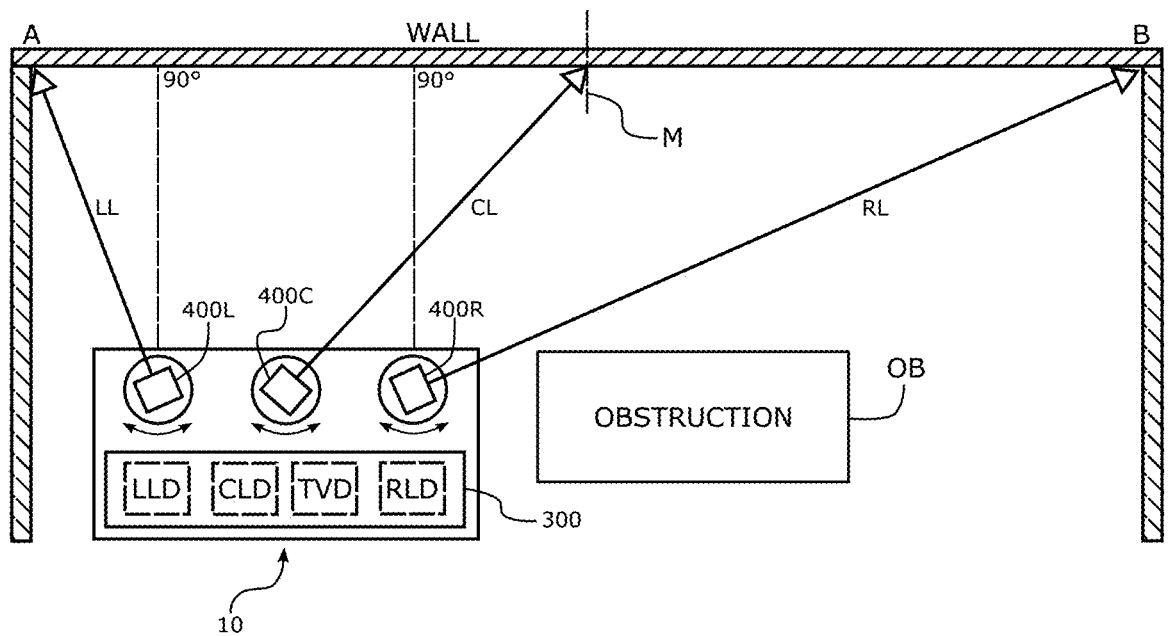
FIG. 3 is a top plan view of a room, showing an example usage of the measuring device of either FIG. 1 or 2 in a horizontal plane.

FIG. 3 is a top plan view of a walled off room, showing an example usage of the measuring device 10 of either FIG. 1 or 2. In this example, the user wishes to find an incremental point, such as a midpoint M, between the corners of the room, represented by endpoints A and B. First, the user positions the face of the measuring device so that it is generally perpendicular to the surface which will be measured, as shown by the 90 degree angles represented in FIG. 2. The user then rotates left light source 400L until its projected light beam LL, such as a laser beam, points directly into corner A, and rotates right light source 400R until its projected light beam RL points directly into corner B. Measuring device 10 will measure the degree of rotation of left light source 400L and display its value in the left light display LLD of display 300, as well as the degree of rotation of the right light source 400R and display its value in the right light display RLD. Measuring device 10 then calculates, as described in more detail with reference to FIGS. 6 and 7, a target value display TVD which corresponds to the degree of rotation necessary for center light source 400C to project its light beam CL at midpoint M. Since the measured degree of rotation of center light source 400C is displayed as a value in center light source display CLD, the user may simply rotate the center light source 400C until the value displayed in center light source display CLD is the same as the value displayed in the target value display TVD. Once the values match each other, center light source 400C will be pointing directly at the midpoint M of points A and B.

As shown in FIG. 3, even when the user and the device 10 are positioned on either side of the target incremental point, such as midpoint M, due to an obstruction OB present in front of midpoint M, measuring device 10 still enables accurate measurement and indication of the midpoint M between any endpoints A and B present on the same measured surface. Accordingly, measuring device 10 is able to find the incremental point or midpoint in more diverse situations where various obstructions or other factors prevent the user from standing or being present in certain locations.

Figure 4:
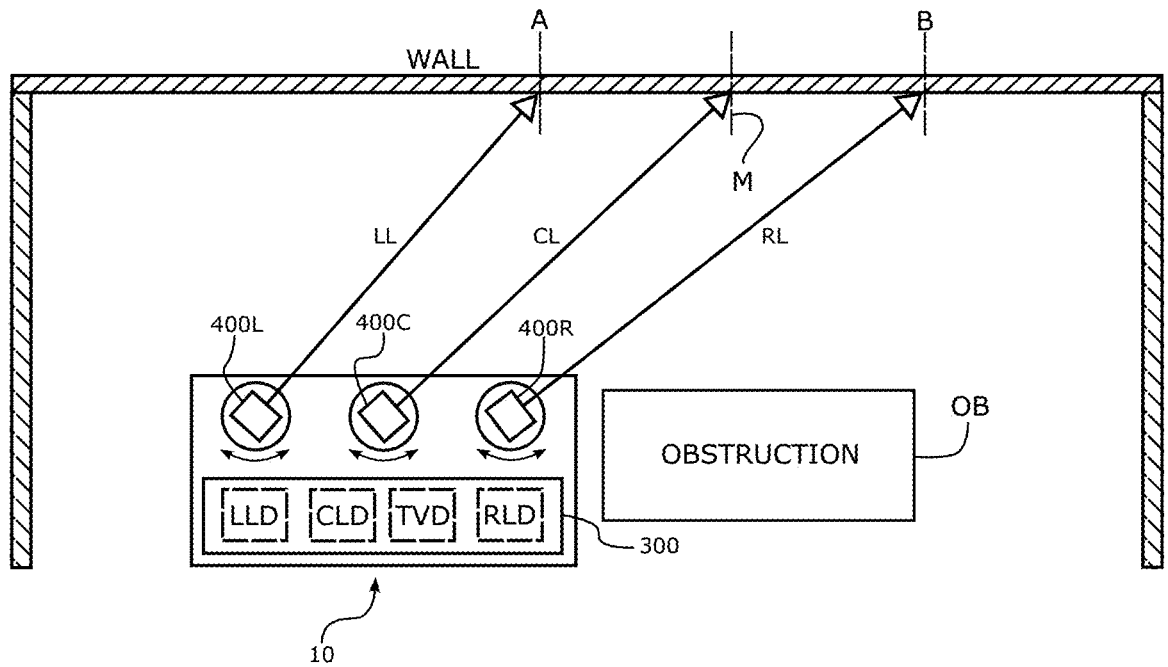
FIG. 4 is a top plan view of a room, showing another example usage of the measuring device of either FIG. 1 or 2 in a horizontal plane.

FIG. 4 is a top view of a room, showing another example usage of measuring device 10 of either FIG. 1 or 2. While the usage of device 10 is the same as described with reference to FIG. 3, the example of FIG. 4 shows a finding of midpoint M or other incremental point between new locations for points A and B, no longer in the corners of the room. As illustrated in FIG. 4, device 10 can flexibly find the midpoint M or other incremental point between any two points A and B sharing a common plane or surface, and can do so even when obstacles OB are present that prevent the user from standing directly in front of any of the points A, B or midpoint M.

Preferably, the measured degree of rotation for device 10 is always displayed for each light source 400L, 400C and 400R in real time, such that any clockwise or counterclockwise rotation immediately changes the relevant displayed value. As an example, the measured degree of rotation can be numerically represented as an angle of rotation of the corresponding light source, ranging from positive to negative, thereby easily enabling the user to know whether to rotate the center light source 400C in a clockwise or counterclockwise direction as the number changes in real time by getting closer or further away from the target value display TVD number. Alternatively, non-numerical representations may also be used, or a combination of numerical and non-numerical, as long as the user is able to use the information to appropriately rotate the center light source 400C until it matches the target value display TVD information. As an example, to greatly simplify the system, no measured values need to be displayed to the user, and display 300 could comprise a single indicator light which simply lights up when the center light source 400C is rotated to the appropriate degree matching the internally computed midpoint. However, a benefit of displaying the angles of rotation is that such information enables other beneficial uses of device 10. For example, the user may simply wish to measure an angle between the device and a point along the wall, or use the angles as inputs for other mathematical formulas to enable more diverse calculations and measurements to be performed.

Further, it may be appreciated that by measuring the midpoint of a midpoint, measuring device 10 can similarly enable the user to find other increments such as fourths, eights, and sixteenths along a surface. This is enabled, for example, by first identifying midpoint M between initial points A and B using device 10, then rotating either left light source 400L or right light source 400R to point at the identified midpoint M (i.e. newly setting the midpoint M as either point A or B), such that device 10 subsequently calculates a new midpoint and value in target value display TVD. This can be repeated to yield smaller and smaller halved increments, for example.

In an alternative embodiment, a switching mechanism is present on device 10 such that it calculates other increments between points A and B besides the midpoint. If the device 10 is programmed with multiple computation modes, a switch could enable the user to switch from a midpoint finding mode to a one-third finding mode, for example. In such case, the device would compute one-third the distance from point A or B, and display the computed rotational angle in the target value display TVD. The user would then rotate center light source 400C until its displayed rotational angle in center light display CLD matches the computed value in target value display TVD, thus causing center light beam CL to be pointed at a one-third increment point between points A and B. Other increments could similarly be programmed, such as one-fourth, one-fifth, one-sixth, etc, and as further described with reference to FIG. 7, for example.

Figure 5:
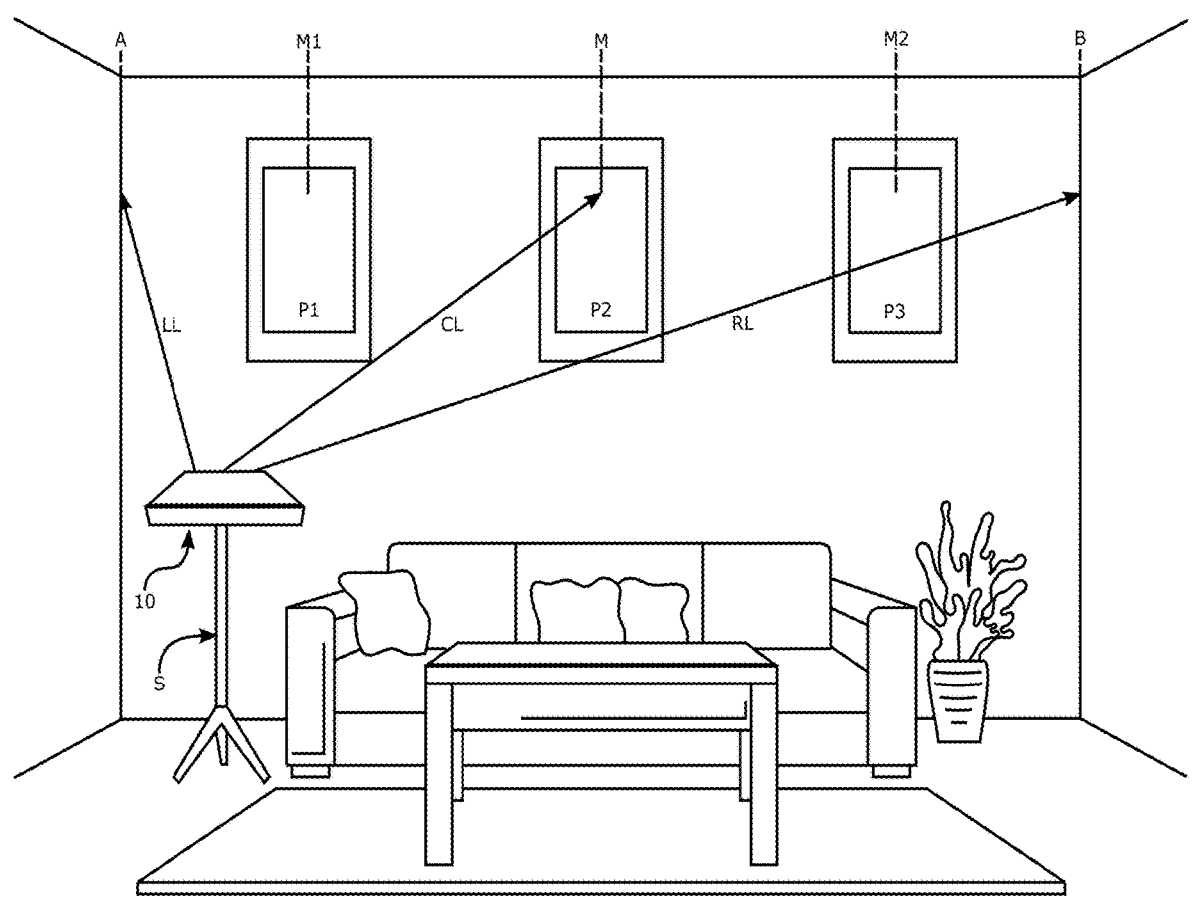
FIG. 5 is a perspective view of a room, showing an example usage of the measuring device for points on a vertical wall surface.

FIG. 5 is a perspective view of a room, showing another example usage of the measuring device 10 of either FIG. 1 or 2 for finding a midpoint M or increment M1 or M2 high up on a vertical wall surface. By using device 10, pictures P1, P2 and P3 can be hung in an aesthetically pleasing spacing high up on a wall at measured increment M1, midpoint M, and increment M2, respectively, between corners A and B of the room. Further, as shown, measuring device 10 does not need to be positioned directly in front of the desired midpoint M or incremental point M1 or M2, and can therefore provide more flexible positions within the room to use device 10, such as to the side of the sofa couch or coffee table shown in FIG. 5. The user of device 10 also does not need to climb a ladder or otherwise move the device to reside in the same horizontal plane as the measured points, thereby keeping the user in a safer and more flexible position on the ground while making measurements.

As described previously, to ensure accurate measurements, device 10 should always be oriented such that its face is perpendicular to the surface being measured (as described with reference to FIGS. 3 and 4), but to measure high-up on the vertical wall, device 10 can then be angled upwards while maintaining the perpendicular relationship with the wall. In the example of FIG. 5, device 10 is shown on a stand S, such as a tripod, to further stabilize device 10 and ensure more accurate measurement results.

It may be appreciated with reference to the FIGS. 1 and 2, that light sources 400L, 400C, 400R reside in the same plane to project three separate points of light, such as laser points, onto a target surface in an aligned manner with respect to one another. However, to provide further functionality to device 10, a beam splitter could also be utilized with one or more of light sources 400L, 400C, 400R, thereby causing the light beam to be split into a spectrum or line of light transverse to one or more of the aligned points, such as at a right angle to an imaginary line formed between the aligned points. In such embodiment, device 10 would not have to be angled upwards as shown with reference to FIG. 5, but could be pointed directly at the wall, while the vertically split light beams would indicate vertically extended incremental positions along each line of light, such as shown with the dotted lines extending from M1, M and M2 of FIG. 5. This would be particularly useful, for example, where a user desires to hang pictures P1, P2 and P3 at determined horizontal increments relative to corners A and B, but at differing heights along the wall, i.e. differing vertical placements. It may be appreciated that any suitable beam splitter or prism could be used in conjunction with the one or more light sources 400L, 400C, 400R, either as a permanent fixture of device 10, or as an optional optical element that slides or flips over each light source when desired.

It may be further appreciated that the device 10 may also be oriented sideways to identify the midpoint M or other incremental points between a floor and ceiling, for example, or other similar uses. In such example use, the laser points on the target surface would be aligned in a vertical relationship, as opposed to a horizontal relationship with respect to the user environment.

Although the examples of FIGS. 3-5 are shown with reference to a room, it may be appreciated that measuring device 10 will work with any surface indoor or outdoor, if points A, B and the target incremental point all reside in substantially the same plane, such as along the same measured surface. Further, the distance at which the target point may be measured and indicated and the accuracy of measurements may be improved through selection of higher grade components, including stronger lasers, more accurate sensors for measuring degree of rotation, precision in manufacturing, etc. However, preferably entry models may be designed at minimal cost while providing sufficient accuracy and range for the average household user, while higher cost models may be designed for professional tradesmen involved in architecture and construction, for example. Further, it may be appreciated that device 10 may include a calibration protocol for calibrating the device after manufacture (e.g. as part of a quality control procedure) and/or by the user, in order to ensure higher accuracy of device 10.

Further, although the embodiments described herein show a device 10 having three light sources 400L, 400C, 400R, it may be appreciated that one or more light sources could be substituted with other optical elements enabling the projection of a light beam onto a target surface. For example, a single high-power laser in combination with various beam splitting elements, mirrors or other optical elements could be utilized to reduce the number of laser light sources while still enabling the projection and control of three separate light beams onto a target surface. It is also contemplated that more than three light sources could be utilized with device 10, for example, wherein two light sources may be used to define the endpoints, and two or more additional light sources may be used to identify and mark two or more calculated incremental points on a common target surface, for example.

Figure 6:
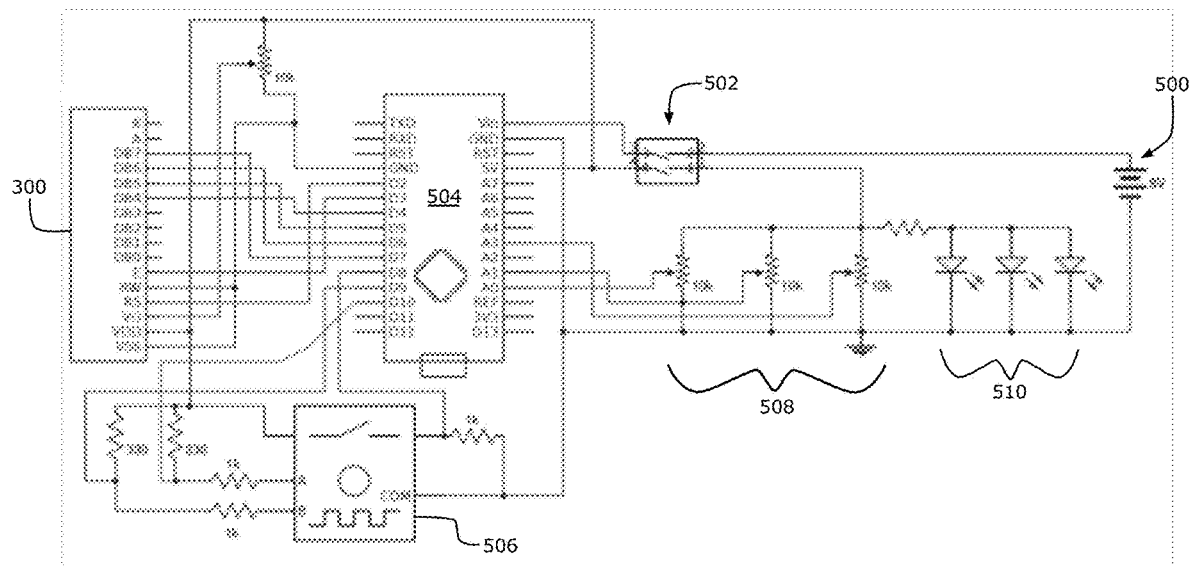
FIG. 6 is an example circuit diagram for the measuring device.

FIG. 6 is a circuit diagram for the measuring device 10, showing display 300, and additionally power source 500; power switch 502; computing unit 504; rotary encoder 506 (optional); rotation measuring elements 508; and laser internal resistors 510. The circuitry and elements of FIG. 3 are enclosed by housing 100 shown in FIGS. 1 and 2.

Power source 500 is shown as a 9-volt source such as a 9V battery, but other power sources may be utilized including AA or AAA batteries, rechargeable built-in lithium ion batteries, or direct wired connections, for example. To ensure portability, preferably the device 10 is equipped with battery power, and optionally for heavy use, a connector for direct wired power connections through a power adapter may be provided.

Computing unit 504 performs the computations described with reference to FIG. 7 below, and may comprise, for example, an Arduino Nano type programmable circuit board, or any other suitable circuit board capable of being programmed to perform the one or more calculation modes necessary to operate measuring device 10. The rotational or angular position of each rotational element 420L, 420C, 420R is measured by rotation measuring elements 508 as a measured degree of rotation or angle or rotation. Rotation measuring elements 508 may comprise, for example, voltage-based potentiometers. The measured degree of rotation, which can be expressed as an angle, for example, is sent as a signal to computing unit 504 for the computations described with reference to FIG. 7. Suitable potentiometers for a household use measuring device 10 may include potentiometers having 50 kΩ resistance and ±5% error tolerance. Amount of voltage fed to each potentiometer may also be varied in order to adjust the accuracy and tolerance of rotational measurements, such as for higher end professional-use models of measuring device 10.

In the embodiment shown in FIG. 6, rotary encoder 506 is optionally provided to drive a motor rotation (motor not shown) for center light source 400C to enable automated motorized rotation of the light source such that it points to a calculated midpoint or other incremental point.

Although a particular circuit architecture and components are shown with reference to FIG. 6, it may be appreciated that other functionally equivalent architectures and components may be employed to enable the inventive features and operation of measuring device 10 described herein.

Figure 7:
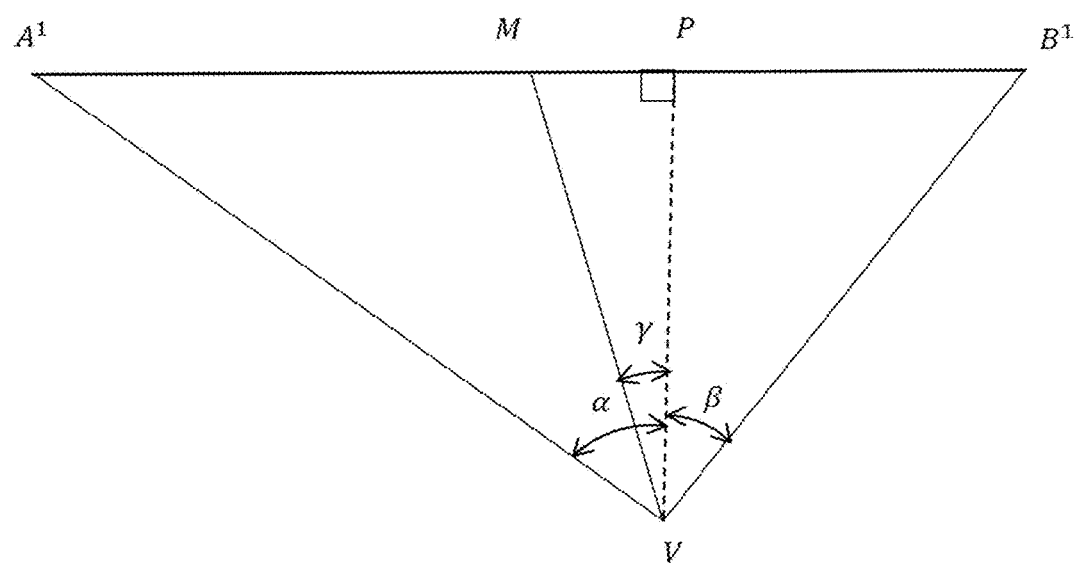
FIG. 7 is a geometrical representation of relevant angles and other input variables used by the measuring device to calculate a midpoint.

FIG. 7 is a geometrical representation of relevant angles and other input variables used by measuring device 10 to calculate a rotation target value γ for center light source 400C corresponding to a midpoint M, between points $A^1$ and $B^1$ on a same surface as M. Computations may be performed with computing unit 504 described previously and programmed with the algorithms described herein. With reference to FIG. 7, M is at the center of $A^1$ and $B^1$, or in other words, $MA^1=MB^1$, and a perpendicular line (dotted line in FIG. 7) is defined from vertex V (existing at or behind device 10) and point P (on the same surface as points $A^1$ and $B^1$). α is the measured angle from the perpendicular line for left laser LL (such as displayed in left light display LLD of device 10), and β is the measured angle from the perpendicular line for right laser RL (such as displayed in right light display RLD of device 10). γ is the calculated angle from the perpendicular line corresponding to the midpoint M or other desired incremental point, or in other words, the rotation target value (such as displayed in center light display CLD on device 10) or target angle or rotation. Solving for γ yields the following suitable algorithm for computing midpoint M using device 10:

$$\gamma=\arctan(½(\tan(\alpha)-\tan(\beta)))$$

In another embodiment, point M can be any desired incremental point between points $A^1$ and $B^1$ other than a midpoint, such as ⅓, ¼, ⅕, etc. In such case, the following general algorithm for computing point M is suitable, wherein n is the increment denominator (e.g., n=3 for ⅓, n=4 for ¼, n=5 for ⅕, etc):

$$\gamma = \arctan\left(\frac{n-1}{n}\tan(\alpha) - \frac{1}{n}\tan(\beta)\right)$$

It may be appreciated that this algorithm can also be used to compute the midpoint between points $A^1$ and $B^1$ where n=2.

While device 10 and its methods of use have been described herein, a process for determining and indicating an incremental point on a target surface is also provided herein. In one example, a first laser is rotated to project a first laser point on a target surface, and a second laser is rotated to project a second laser point on the same target surface. An angle of rotation is measured for each of the first and second lasers, and then based on those measurements, a target angle of rotation may be calculated corresponding to an incremental point between the first and second laser points on the target surface, such as described with reference to the formulae of FIG. 7. A third laser may then be rotated until it reaches the target angle of rotation and projects a third laser point at the desired incremental point on the target surface.

In another example of the process, a computing unit may be used to automatically calculate the target angle of rotation in real-time as each of the first and second lasers are rotated. In other examples, a display unit may indicate when the third laser has been rotated to reach the calculated target angle of rotation, or otherwise may be used to display the angle of rotation of any of the first, second and third lasers, as well as the target angle of rotation. This may enable the user, for example, to more easily match the angle of rotation of the third laser with the target angle, thereby achieving a state where the third laser is pointed at the desired incremental point on the target surface.

In another aspect of the process, the first, second and third laser points may be projected in alignment with respect to one another on the target surface. However, in another aspect of the process, one or more of the first, second or third lasers may be split, such as with the use of a beam splitter or prism, for example, to project a spectrum or line of laser light onto the target surface transverse with respect to the aligned laser points.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A process for determining and indicating an incremental point on a target surface, comprising:
   independently rotating a first laser to project a first laser point on the target surface;
   independently rotating a second laser to project a second laser point on the target surface;
   measuring an angle of rotation for each of the first laser and the second laser;
   based on the measured angle of rotation for each of the first laser and the second laser, calculating a target angle of rotation corresponding to an incremental point between the first laser point and the second laser point on the target surface; and
   independently rotating a third laser until it reaches the target angle of rotation and projects a third laser point at the incremental point on the target surface.

2. The process of claim 1, further comprising using a computing unit to automatically calculate the target angle of rotation in real-time as each of the first and second lasers are rotated.

3. The process of claim 1, further comprising using a display unit to indicate when the third laser has been rotated to reach the calculated target angle of rotation.

4. The process of claim 1, further comprising using a display unit to display the angle of rotation of the third laser and the target angle of rotation.

5. The process of claim 1, wherein the first, second and third laser points are projected in alignment with respect to one another on the target surface.

6. The process of claim 5, further comprising splitting at least one of the first, second and third lasers to project a line of laser light onto the target surface transverse to the aligned first, second and third laser points.

7. The process of claim 1, wherein each of the first, second and third laser is in communication with a rotation measuring element, and further comprising using the rotation measuring element to measure the angle of rotation for each of the first laser and the second laser and the target angle of rotation for the third laser.

8. The process of claim 1, further comprising automatically rotating the third laser until it reaches the target angle of rotation and projects the third laser point at the incremental point on the target surface.

9. The process of claim 8, further comprising using a motor to automatically rotate the third laser according to the calculated target angle of rotation.

10. The process of claim 1, further comprising wherein the target angle of rotation corresponds to a non-perpendicular angle with respect to the target surface.

* * * * *